United States Patent Office 2,707,859
Patented May 10, 1955

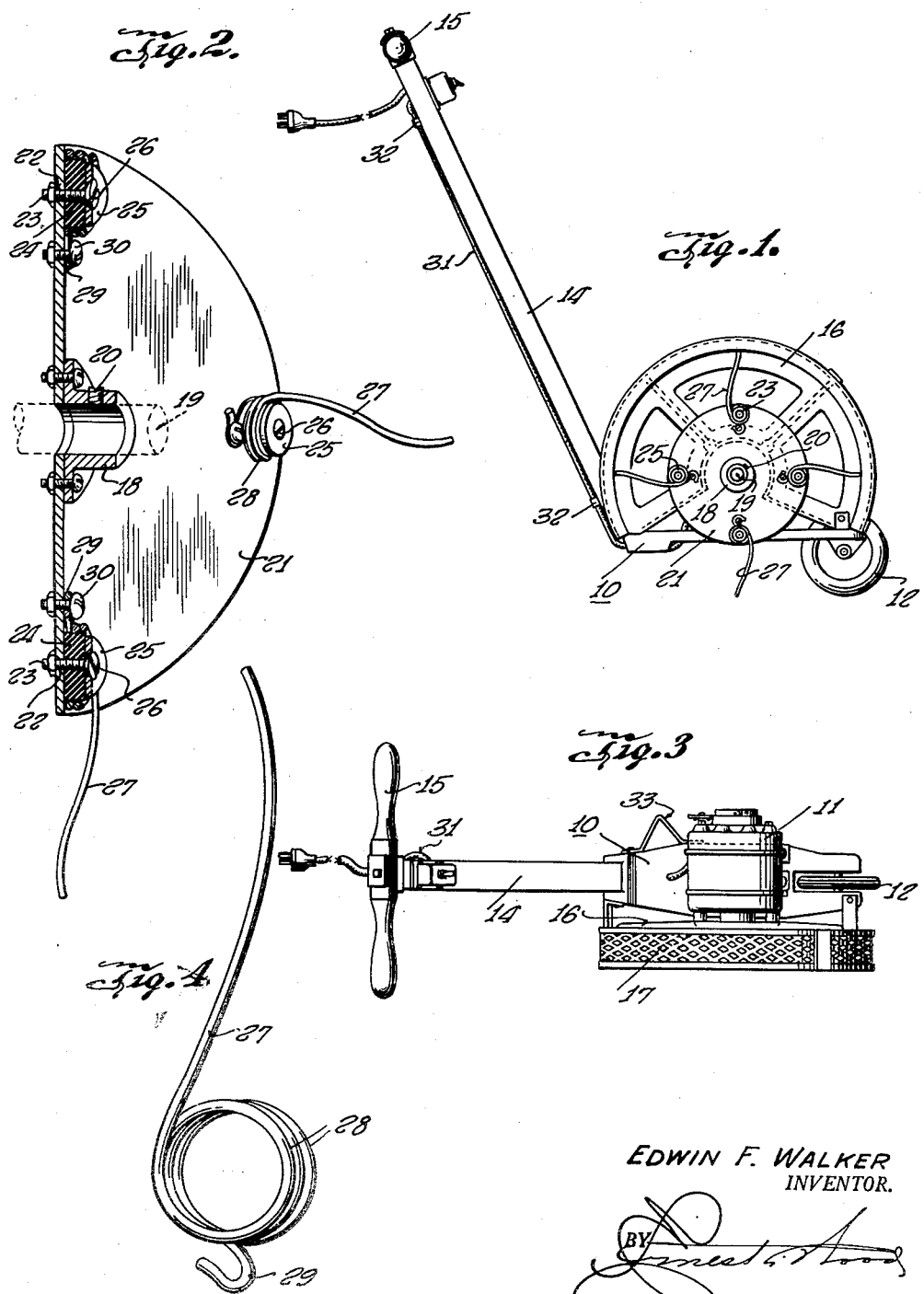

2,707,859

ROTARY CUTTING DISC FOR LAWN EDGER

Edwin F. Walker, Dallas, Tex., assignor of one-half to Juanita F. Walker, Dallas, Tex.

Application July 20, 1951, Serial No. 237,709

2 Claims. (Cl. 56—295)

This invention relates to lawn edgers and more particularly to an electrically operated machine for cutting the grass of lawns, parkways and the like adjacent to the edges of sidewalks and curbing.

The principal object of the invention is to provide a machine consisting of a wheel supported frame and an operating handle, the frame carrying an electric motor having on its armature shaft a collar carrying a disc to which is connected at circumferentially spaced points the ends of a group of resilient tines. When the motor is operated, the disc is rotated, causing the tines to be brought successively into engagement with the grass with a whipping action and thus sever the same along the edges of sidewalks and other concrete structures.

Another object of the invention is to provide a lawn edger having blades or grass severing elements which, being resilient, will yield if allowed to strike hard obstacles such as the edges of sidewalks and the like and will continue to function without breakage or other impairment to the machine or damage to the adjacent walk.

The tines are each comprised of a length of steel wire having adjacent one end a series of convolutions wound about a rubber grommet embracing a bolt or stud set in the disc adjacent its perimeter, the end of the wire adjacent the convoluted portion of the wire being anchored to the disc. The convolutions and grommet absorb vibrations and obviate fatigue in the metal of the tines which latter are found to be superior in performance and stability than the more or less rigid blades of conventional lawn edgers, the latter being susceptible to breakage unless care is exercised to avoid bringing them into contact with the edges of sidewalks and the like.

With the foregoing objects in view, the invention has further reference to certain features of accomplishment which will become apparent as the description proceeds, taken in connection with the accompanying drawing wherein:

Figure 1 is a side elevational view of a lawn edging machine constructed according to the invention.

Figure 2 is a perspective view of the tine supporting disc in diametrical section on a larger scale.

Figure 3 is a top plan view of the machine, and

Figure 4 is a detail perspective view of one of the tines per se.

Continuing with a more detailed description of the drawing, reference numeral 10 denotes a frame or platform of any desired shape or design, on which is mounted an electric motor 11. At the forward end of the frame or platform is mounted a supporting wheel 12 adapted to run on the concrete walk or curbing adjacent which the grass is to be cut. At the opposite end of the platform 10 is attached a handle 14 which carries at its upper end handle bars 15.

Affixed to one end of the platform 10 is a casting 16 adapted to support a semi-circular, reticulated flange 17. The flange 17 serves as a guard or shield to intercept grass and other substances which would otherwise be thrown upwardly by the tines of the grass severing head.

The grass severing head consists primarily of a collar 18 which is received by the end of the motor shaft 19 and is held thereon by means of a set screw 20. Attached to the collar 18 is a circular flange or disc 21. The latter being provided with a plurality of circumferentially spaced apertures 22 adjacent its perimeter. A bolt 23 is disposed in each aperture 22 and on each bolt is mounted a rubber grommet 24 and a metal washer 25 against which bears the head 26 of the bolt 23. Each of the tines is composed of a length of wire 27 in which is made a series of convolutions 28 adjacent one end in the manner shown in Figure 4. A loop 29 is provided at one end by which the tine is attached to the disc 21 by means of screws 30.

When the motor is set in operation, the tines are brought into whipping engagement with the grass next adjacent the edge of the walk or curbing, thereby cleanly severing the grass along the edge of the walk and curbing without damage to either the latter or the tines in view of the resiliency and consequent spring-back qualities of the tines.

A current supply cable 31 to the motor is attached by spaced clips 32 to the handle 14. Secured to the frame or platform 10 adjacent its rear end is a support 33 which is adapted to support the machine in substantially upright position when not in use.

Manifestly, the construction as shown and described is capable of some modification and such modification as may be construed to fall within the scope and meaning of the appended claims is also considered to be within the spirit and intent of the invention.

What is claimed is:

1. In a lawn edging machine, a grass severing head comprising a circular flange adapted for high speed rotation, a disc attached to said flange in a vertical plane and provided with circumferentially spaced apertures, a resilient tine having one end secured to said disc and a series of convolutions adjacent the secured end of said tine, a bolt in each of said apertures, a rubber grommet surrounding said bolt and embraced by the convolutions of said tine, said tines being adapted to extend radially from said disc for severing engagement with lawn grass during rotation of said flange.

2. In a lawn edging machine, a grass severing head comprising a flange adapted for high speed rotation, in a vertical plane, a disc attached to said flange, said disc having a series of annularly spaced apertures adjacent its periphery, a rubber grommet having an aperture in register with each aperture of said disc, a washer on said grommet whose central opening is in register with the aperture of said grommet and disc, a bolt securing said grommet and washer to said disc, a length of resilient steel wire having a series of convolutions therein adjacent one end embracing said grommet, the opposite end of said wire extending radially from said disc and means for connecting said one end of said wire to said disc.

References Cited in the file of this patent

UNITED STATES PATENTS

| | | |
|---|---|---|
| 515,031 | Turner | Feb. 20, 1894 |
| 2,281,639 | Swan | May 5, 1942 |
| 2,328,121 | Bartek | Aug. 31, 1943 |
| 2,410,196 | Benthall, Sr. | Oct. 29, 1946 |
| 2,538,230 | Boggs | Jan. 16, 1951 |